3,669,792
PROCESS FOR PRODUCTION OF VAPOR PERMEABLE SHEET-LIKE MATERIALS
Konosuke Mitsukawa and Hiroshi Hattori, Shiga, Toyohiko Hikoda, Kyoto, and Yoshinori Masubuchi, Shiga, Japan, assignors to Toyo Rayon Kabushiki Kaisha, Tokyo, Japan
No Drawing. Filed Oct. 14, 1968, Ser. No. 767,475
Claims priority, application Japan, Oct. 13, 1967, 42/65,611
Int. Cl. B32b 7/04; B44d 1/44
U.S. Cl. 156—249         11 Claims

ABSTRACT OF THE DISCLOSURE

A process for producing vapor permeable sheet-like materials which comprises coating a solution of a film-forming polymeric material on a support material, and applying a gas stream at a flow rate of from 1 meter per second to 50 meters per second on the coated surface, until a dense gelated layer forms on the surface when the coated material is thereafter subjected to a coagulating step. The vapor permeable sheet-like material is finally coagulated.

BACKGROUND OF THE INVENTION

Field of the invention

The present invention relates to a process for the production of vapor permeable sheet-like materials.

Description of the prior art

A number of methods have been proposed for the manufacture of vapor permeable polymer films having reduced sweating or ill-venturating nature, for use as an artificial leather material for making shoe-upper materials, clothing, gloves and the like.

One of the most suitable methods for obtaining such artificial leathers formed of highly vapor permeable polymer films is the so-called "wet filming process" in which a film-forming polymer solution is applied to a support material, and the coated product is then soaked in a bath containing a liquid which dissolves neither the support material nor the polymer but which is miscible with the solvent in the polymer solution. The polymer is then coagulated. This method suffers from one great drawback: it often gives rise to the generation of large, rough voids in the film, which in turn leads to the formation of pin holes, with resultant poor film strength.

In order to obviate the above drawback and to improve vapor permeability, it is desirable to obtain a film which has a microporous structure by the wet filming process. Various methods have been proposed for obtaining a film with microporous structure, such as: (1) a method comprising exposing the support material coated with a polymer solution to humid air, then soaking the material in a non-solvent and coagulating, which is disclosed in U.S. Patent No. 3,000,757; (2) a method in which a polymer solution is mixed with a non-solvent which is miscible with the solution to the extent that the polymer solution does not undergo gelation but forms a colloidal dispersion, the resultant mixture being applied to the support material, followed by soaking and coagulation, which is disclosed in U.S. Patent No. 3,100,721; (3) a method comprising admixing a relatively large amount of a non-solvent with a polymer solution to thereby separate the solution into a gel portion and a liquid portion, coating the support material with the gel portion, and thereafter soaking in a non-solvent bath, which is disclosed in U.S. Patent No. 3,190,766; and (4) a method comprising soaking the support material, after it has been coated with a polymer solution, in a bath containing a mixture of a solvent and a non-solvent for the polymer, which is disclosed in U.S. Pat. No. 3,208,875.

These methods are somewhat effective for obtaining microporous films, but each method has the following drawbacks in industrial application: method (1) needs a humidity-conditioned atmosphere and also requires prolonged time to effect the exposure, which makes process control rather complicated with poor productivity; method (2) suffers from the difficulty that a very limited portion range for the addition of the non-solvent in the preparation of the colloidal dispersion is operable, and in addition, is an unstable process operation since it is very susceptible to adverse effects due to the ambient temperature and humidity; method (3) involves a technical difficulty in that both the separating and the coating steps are complex, and also suffers from poor polymer yields; and method (4) requires a prolonged period for coagulation, due to the use of a bath containing highly concentrated solvents in which the polymer is barely coagulatable, thus inviting a poor production rate or enlargement of the bath length both of which are not attractive from an economics viewpoint.

SUMMARY OF THE INVENTION

The present invention provides a process for obtaining a highly vapor permeable film which is similar to natural leather.

Specifically, the process of this invention comprises first applying a film-forming solution to a support material, bringing the resultant support material, while the polymer remains in the uncoagulated state, into contact with a stream of gas which is at a flow rate of from 1 to 50 meters per second for a period of greater than five seconds. Thereafter, the polymer is coagulated to obtain a film which illustrates high vapor permeability.

Typical support materials are woven fabrics, knit fabrics, non-woven cloths, paper, plastic films and metallic foils.

The gas utilized in the present invention can be air, but other gases such as nitrogen, carbon dioxide, and the like, basically comprising those gases which are inactive to the polymer solution.

It should be noted that the main criteria for determining an appropriate "gas flow" is that the gas have sufficient kinetic energy to effect the desired processing results.

A large series of acceptable polymer solutions are defined in the specification.

An object of the present invention is to provide an efficient and novel process for obtaining a highly vapor permeable film which is similar to natural leather.

Another object of this invention is to provide a process whereby drawbacks encountered in the prior art processes have been completely overcome by the use of simple apparatus without any reduction in productivity or the need for strict atmospheric controls.

DESCRIPTION OF THE PREFERRED EMBODIMENTS

The process of this invention comprises first applying a film-forming solution to a support material, bringing the resultant support material, while the polymer still remains in the uncoagulated state, into contact with a stream of gas at the flow rate of from 1 to 50 m./sec. for a period greater than 5 seconds, and thereafter coagulating the polymer to thereby obtain a film having a high vapor permeability.

More particularly, a polymer solution is first applied to a support material, such as a woven fabric, a knit fabric, a non-woven cloth, a plastic film, paper, a metallic foil, etc. and the resultant support material is contacted with a stream of gas having kinetic energy at an appropriate wind pressure, flow rate and angle of contact, all this occurring pior to soaking in a bath containing a non-solvent which is at least partly miscible with the solvent contained in the polymer solution but which does not dissolve the polymer material. Thereafter, the polymer is coagulated to give a highly vapor permeable film.

The gas used in the practice of this invention can be dust-free air, but other gases such as nitrogen, carbon dioxide, and the like, which are inactive to the polymer solution may also be used, either alone or as mixtures thereof. The kinetic energy of the gas flow may be imparted by conventional methods, for example, by using various types of gas compressors, blowers, etc., and the gas having kinetic energy can be applied to the coated solution either as an open gas flow or as a confined gas flow after being passed through a nozzle, or nozzles of various shapes.

The wind pressure and the rate of the flow can be indicated by wind speed and hours, respectively. In accordance with the process of this invention, the speed of the gas applied is usually greater than 1 m./sec. The upper speed limit is generally dependent upon the viscosity of the solution to be applied and varies greatly due to the varying influence of surface smoothness. However, a gas speed of up to 50 m./sec. may be employed without greatly impairing the surface smoothness. The gas flow is exerted until a dense gelated layer is formed on the surface of the coated solution when the coated solution is thereafter soaked in the non-solvent to the polymer, i.e., the flow is maintained for the period of at least 5 seconds, preferably more than 10 seconds. When the moisture content in the gas, i.e., humidity, is comparatively high, the time of application of the gas flow may be somewhat shortened, but a sufficient effect can also be obtained by the use of a dry gas. Humidity has little significance in the practical operation of the process of this invention.

The temperature of the gas and of the coated solution is preferably not too high since a high temperature favors the dispersion speed of the solvent molecules in the solution (this is apparent from the micropore forming mechanism, which will be later discussed in detail). From this aspect, a temperature of not greater than 50° C., preferably not greater than 30° C., is generally desirable.

The gas flow conditions can be selected within an optimum range, depending upon the kind or composition of the polymer in the film-forming solution used. Preferred conditions of the gas flow, with respect to a series of given solutions, is shown in Table 1.

Additional treatments may be performed before applying the gas flow to the coated solution, or after applying the gas flow but prior to immersion in the non-solvent bath. Such treatments include, for example, adjustment of the viscosity of the coating materials by cooling or heating to any suitable extent. Such additional treatments, however, do not constitute any essential part of the process of this invention.

The polymers used in the practice of this invention may be selected from a wide variety of high molecular materials, as long as they are capable of forming films. Typical polymers employed include polyurethanes, polyamides, poly(vinyl chloride) and copolymers of vinyl chloride with vinyl acetate, vinyl methyl ether, acrylic acid esters and the like, and various other polymers either alone, or mixtures thereof. The only criteria is the film-forming capability.

The solvent used for preparing the polymer solution may be any one capable of dissolving the above polymers, and it must be at least partially miscible with the non-solvent. As to the use of water as the non-solvent, it is desirable to employ at least partly water-miscible solvents such as, for example, dimethyl formamide, dimethyl sulfoxide, dimethyl acetamide, dioxane, tetrahydrofuran, gamma-butylolactone, pyrrolidone, cyclohexanone and the like. The solvent may be used as a single component or as mixtures of two or more solvents.

These solvents may be incorporated with the non-solvent for the polymer, for example, water in a small amount, so as not to cause gelation of the solution. In this case, the process can be carried out in more efficient manner, since the process steps are shortened, and there is formed a microporous structure having a denser surface than an interior.

The polymer solution may be further mixed, if desired, with various additives including fillers, pigments, plasticizers, aging inhibitors, ultra-violet absorbents, surface active agents, silicone oil, wax, etc.

The higher the viscosity of the polymer solution, the less influence there will be due to fluctuation in the wind pressure or flow rate, which could cause some degradation of the surface smoothness and uniformity. Hence, a viscous material is beneficial for shortening of the process steps, since more fluctuation can be allowed. In general, however, a viscosity of more than 10 poise, preferably 150–1,300 poise, is satisfactory for conducting the process of this invention. The higher the concentration, the less the time of gas blow required. A concentration of more than 5% generally gives satisfactory results. The

TABLE 1

| Kind of polyurethane | Solvent | Concentration (wt. percent) | Coating composition (wt. parts) | Temp. (° C.) | Humidity (percent RH) | Flow rate (m./sec.) | Time applied (sec.) |
|---|---|---|---|---|---|---|---|
| Polyethylenepropylene adipate/MDI [1]/ethylenediamine (Reaction molar ratio 2.3:0.88). | DMF | 33 | | 15–35 | 10–85 | 4–30 | 5–00 |
| | DMF | 33 | P.V.C. 20, DOP 15 | 18–30 | 0–45 | 10–15 | 10–35 |
| | DMF | 33 | P.V.C. 30, DOP 20 | 10–25 | 0–60 | 2–10 | 5–40 |
| | DMF | 33 | Carbon black 10 | 15–33 | 15–90 | 2–40 | 5–28 |
| | DMF | 33 | Carbon black 30 | 15–33 | 15–90 | 2–5 | 10–30 |
| Polycaprolactone/TDI [1]/hydrazine | DMA | 25 | | 20–35 | 0–55 | 2–8 | 5–40 |
| | DMA | 25 | Calcium carbonate 15 | 15–35 | 0–55 | 2–8 | 5–00 |

[1] MDI: Diphenylmethane-4,4'-diisocyanate, TDI: Tolylenediisocyanate, DMF: Dimethylformamide, DMA: Dimethylacetamide, P.V.C.: Polyvinyl chloride, DOP: Dioctylphthalate.

NOTE.—The composition is shown per 100 parts of polyurethane.

The polymer solution, subjected to the kinetic energy of the gas flow, is then soaked in a bath of non-solvent, i.e., composed of a solvent that is at least partly soluble for the solvent contained in the polymer solution but incapable of dissolving the polymeric material per se, to thereby coagulate the polymer. Coagulation is then followed by solvent removal and drying to form a vapor permeable microporous film. Since the conditions for the gas flow need not be as strictly controlled as required by prior processes (as long as it is kept within the above-mentioned range), process control is effected in a much simpler manner than with conventional processes.

proportion of the various additives must not exceed twice the weight of the polymer, otherwise it could give rise to unfavorable results, such as lowering the mechanical property and also leading to roughening of the film surface.

The support materials on which the polymer solution is applied are those used as substrates for artificial leather, such as woven fabrics, knit fabrics, non-woven cloths and those illustrating the basic texture of natural leather. Occasionally paper, film and metallic foil can be used. In the latter case, these can be directly used for various purposes other than making an artificial leather, but an artificial leather may be obtained by laminating the artificial leather substrate onto the surface of the film after the film has been formed on the support materials, followed by stripping off of the support materials, or else by laminating the film after stripping off the support materials. In the case when the support material has a smooth surface, the surface of the artificial leather obtained will exhibit a superior smoothness. By previously providing suitable embossed patterns on the support materials, a leather having a press-molded pattern may be obtained.

The application or coating of the polymer solution on the support material may be effected by using conventional tools and techniques such as knife coaters, reverse roll coaters, curtain flow coaters, slit die coaters, geesers, etc.

The gas flow may be applied to the polymer solution which is coated on the support material at an angle of contact, such as perpendicular, parallel counter current, parallel concurrent, and at an inclined flow. In order to obtain good quality control, it is preferred to avoid irregular wind rates and pressures.

The non-solvent which is contained in the non-solvent bath used in this invention comprises any of those non-solvents which are inactive with respect to both the support material and the polymer material in the coating solution. It is preferred to use water since it is inexpensive and readily available. A mixture of two or more non-solvents may be used as well. Other solvents or swelling agents which are beneficial for obtaining microporous films by their effect on the degree of coagulation may be incorporated into the non-solvent, if desired.

The non-solvent bath usually is kept at room temperature, but elevated or lowered temperatures may also be used, depending upon the composition of the coating solution, the gas flow-rate and the temperature of the gas flow employed.

A theory has been advanced with respect to the mechanism by which microporous polymer film structures form according to the process of this invention, and is set forth below. This theory is to be non-binding, of course.

When the polymer solution which has been coated on the sheet support material is immersed in the non-solvent bath, the solvent contained in the polymer solution diffuses throughout the non-solvent, while the liquid in the non-solvent bath penetrates and diffuses throughout the body of the polymer solution, resulting in the gradual gelation of the polymeric material from the direction of its surface.

According to studies by the inventors, the structure of the polymer solution, after coagulation, has been found to depend upon the change in the composition ratio, or the concentration gradient between the solvent and non-solvent contained in the polymer solution during the course of coagulation. That is, a small change in the composition ratio, or a low gradient of concentration, will favor the replacement of the solvent by the non-solvent and will lead to the formation of a uniform microporous structure through a regular and uniform coagulation. Moreover, it was found that the progression of the coagulation is tremendously affected by the initial gelating state on the solution surface, which forms at the first moment at which the coated solution is soaked in the non-solvent bath and the diffusion takes place. The diffusion normally takes place immediately after the immersion, with a period often as short as about 0.01 second.

After the polymer solution has been coated on the support material, a saturated vapor layer forms on the surface of the solution due to the evaporation of the solvent and, the solvent molecules in the interior slowly diffuse into the atmosphere by first passing through the solution layer and then through the saturated vapor layer, maintaining an equilibrium state. By contacting the surface of the polymer solution at this time with a gas flow having kinetic energy, the saturated vapor phase is disturbed by the accompanying thinning of the boundary layer due to the saturated vapor pressure. This in turn favors the diffusion of the solvent molecules out of the surface of the solution much more than diffusion from the interior of the solution, and results in the destruction of the equilibrium state which had existed.

Consequently, the polymer concentration becomes so high at the very thin solution layer which is within a micron of the solution surface, that a very thin and dense gelated layer forms on the surface when the coated solution is immersed in the non-solvent bath. After this, the diffusion of the bath solvent and non-solvent can be controlled to yield a uniform coagulation during the formation of the microporous film.

The process of this invention will now be contrasted with a process wherein the coated polymer solution is exposed to a humid atmosphere for a certain period of time and then immersed and coagulated in the non-solvent (hereinafter referred to as a "hygroscopic process").

In the hygroscopic process, the solvent in the polymer solution absorbs water vapor to effect coagulation, so that the solvent employed must be of a hygroscopic nature. Therefore, the use of non-hygroscopic solvents such as 1,1,2,2-tetrachloroethane, isophorone, nitrobenzene, etc., does not yield a microporous structure, due to the impossibility of semicoagulation or the formation of a colloidal solution. On the contrary, the process of this invention can employ any solvents, regardless of their hygroscopic or non-hygroscopic nature. The process of this invention also enables treatment within a short period, whereas the hygroscopic process requires a prolonged time for completing treatment.

In the hygroscopic process, the structure of the solution is fixed by the gelation or coagulation of all of the solvent during the exposure of the coated material to atmospheric moisture so that the product obtained will have a uniform microporous structure only with careful, prolonged process control.

According to the process of this invention, however, the coagulation in a non-solvent is effected after only the exterior layer has been concentrated, so that the microporous structure has a denser outer layer and a comparatively rougher inner layer which resembles that of natural leather.

Moreover, the microporous film obtained according to the process of this invention develops fine wrinkles, similar to natural leather, when formed on a flexible support and the film face is folded inwards, whereas the same support sheet will never form such wrinkles when produced according to the hygroscopic process. This is due to the differences in the properties of microporous structures between films obtained by the hygroscopic process and by the process of this invention, i.e., the former takes on a uniform microporous structure, while the latter has a minute or dense surface layer and a rather rough or sparse interior in comparison with the surface layer.

The characteristic structure of the artificial leather obtained by the process of this invention is also due to the fact that it has an internal surface area nearly equal to that of natural leather.

In addition, the leather obtained by the process of this invention has a high scratch strength, to a degree never attainable by the hygroscopic process. This is one of the most advantageous features of this invention, since the scratch strength of the artificial leather must be kept as great as possible due to the fact that scratches formed on the leather cannot easily be cured or masked by shoe polish or wax, whereas natural leather, though susceptible to scratches, can be easily cured of such scratches by masking with shoe polish and the like.

The process of this invention also provides a high moisture permeability which is one of the most important requirements for general artificial leathers.

The polymeric sheet-like material obtained according to the process of this invention has a unique microporous structure wherein the surface layer is denser than the inner layer because the coated polymer solution is initially concentrated only on its surface portion and is then coagulated in the non-solvent bath. Therefore, it is particularly suitable for use as a facing film for artificial leathers formed of other sheet-like materials.

The present invention will now be illustrated in further detail by the following examples in which "part" means "part by weight."

Example 1

Nylon staples, with a filament size of 3 d. and a fiber length of 51 mm. were formed into a web using a random webber, and then needle punched to produce a felt having an apparent weight of 250 g./m.$^2$. The felt so obtained was then soaked in a synthetic rubber latex consisting of acrylonitrile-butadiene copolymer (NBR), compressed with a mangle, and immersed in a 15% aqueous solution of calcium chloride to coagulate the latex. It was then washed with water, dried, and sliced into non-woven cloth at the thickness of 1 mm. The amount of NBR attached was 235 g./m.$^2$. A polymer solution having a viscosity of 350 poise was separately prepared by mixing 100 parts of polyurethane (obtained by the polyaddition of 2 moles of diphenylmethane-4,4'-diisocyanate to one mole of polyethylene adipate of a molecular weight of 2,000 and having OH groups at both terminals, followed by chain extending with butanediol), 40 parts calcium carbonate, 15 parts polyvinyl chloride resin of a molecular weight of 800, 10 parts carbon black and 525 parts dimethyl formamide.

This polymer solution was coated on the prepared non-woven cloth at a thickness of 1 mm. Then air, at a relative humidity of 50% and a temperature of 25° C. was applied to the surface of the coated solution by being blown through a slit nozzle.

The air blowing conditions were adjusted so that the clearance of the nozzle was 3 mm., the nozzle pitch was 35 mm., the ejection speed was 10 m./sec., the distance between the solution surface and the nozzle was 350 mm., the blowing angle to the solution surface from the nozzle was 90° C., and the blowing period was 15 seconds.

The coated cloth was then passed through a water bath at 25° C. and coagulated therein, rinsed with hot water and dried to form a film of a thickness of 0.42 mm. on the non-woven cloth. A microscopic observation of a cross section of the thus obtained product showed the presence of a continuous and uniform microporous structure, with a pore diameter of 2–3 millimicrons in the internal section, and also disclosed the presence of a denser and more minute microporous structure in the surface layer.

Such a specific microporous structure was formed only after leaving the coated cloth in the atmosphere at a relative humidity of 50% and a temperature of 25° C. for more than 30 minutes, when the air stream described above was not applied thereto.

The film obtained according to the process of this invention had a moisture permeability of 1850 cc./m.$^2$/24 hr., a bend or fold resistance of more than a million times at −5° C. and a Cremens Scratch Strength of 1100 g. The rough porous film with a pore diameter of 30–700 microns, prepared without the application of blowing air, had a moisture permeability of 1950 cc./m.$^2$/24 hr., but cracked after repeated bending or folding of 500,000 times at −5° C., and had an indicated scratch strength of only 700 g.

Example 2

The polymer solution used in Example 1 was coated to a thickness of 1 mm. on the non-woven cloth used in Example 1. Dry nitrogen gas, dehumidified over a calcium chloride absorbing tube at 25° C. was blown on the cloth at a flow rate of 18 m./sec. for 65 seconds in a direction parallel to the cloth and co-current to the direction of travel of the non-woven cloth. The gas-treated cloth was then soaked in an aqueous bath at 20° C. for 10 minutes, washed with mild hot water for an hour, and dried at 120° C. for 8 minutes to give a microporous film having a dense surface layer and a relatively coarse internal layer (with respect to the surface layer). On the other hand, a film obtained by coagulation after being allowed to stand under static conditions, i.e., non-flowing dry nitrogen gas, had only an irregular structure with coarse large pores, even after it was left in the nitrogen gas for over an hour.

Example 3

A polymer solution was a viscosity of 850 poise was prepared by mixing 200 parts polyurethane (obtained by the polyaddition of polytetrahydrofuran having a molecular weight of 2250, with diphenylmethane-4,4'-diisocyanate, followed by chain extension by the use of hydrazine), 60 parts poly(vinyl chloride), 30 parts dioctyl phthalate, 20 parts phthalocyanine blue, Tinubin P (registered trademark of Geigy Co., ultraviolet absorbent), 685 parts dimethyl sulfoxide (DMSO) and 2 parts water. In this example, water was added in such a minor amount that no polymer separated out.

The polymer solution thus prepared was coated to a thickness of 1.5 mm. on a polyester film having a thickness of 100 microns, using a reverse coater, and the coated film was blown with air at a temperature of 30° C. and at a relative humidity of 35% for 12 seconds. A flow rate of 27 m./sec. and a contact angle of 45° to the solution surface were used. The "blown" film was then soaked in an aqueous bath containing 6% DMSO kept at 30° C., rinsed with water, freed from solvent, and dried to give uniform microporous film having a dense surface layer and a relatively coarse internal layer (with respect to the surface layer). On the other hand, a film prepared in the same manner without the application of a flowing air stream had a coarse, non-uniform porous structure.

Example 4

Staples of polyester fiber (filament size 1.5 d.; fiber length 38 mm.) were formed into webs using a cross wrapper, and then needle-punched to produce a felt having an apparent weight of 220 g./m.$^2$. This felt was immersed in a 20% solution of polyurethane (prepared as described in Example 3) in dimethyl sulfoxide, then compressed to such an extent that the polyurethane content became 50 parts per 100 parts of the fiber.

Thereafter the polymer solution used in Example 3 was coated on the felt (using a reverse roll coater) to a thickness of 1.1 mm. The composite was then blown with air at a humidity of 60%, at a temperature of 25° C., and at a flow rate of 40 m./sec. for 10 seconds. The flow direction was opposite to the direction of travel of the coated non-woven cloth. The thus treated cloth was introduced into a water bath kept at a temperature of 18° C., and coagulated therein. After removing solvent and drying, the film was found to have the characteristic microscopic structure of this invention, i.e., with a dense surface layer and a comparatively coarse interior. This was determined by microscopic observation.

Example 5

Flano textile, woven from a nylon-rayon mix-spun yarn (30/70) and napped, was coated with a polymer solution to a thickness of 0.8 mm. using a knife coater. The polymer solution had a viscosity of 1600 poise and comprised 100 parts polyurethane (prepared by the polyaddition of one mole of polydiethylene adipate (molecular weight 1800) with 1.6 mole of diphenylmethane-4,4'-diisocyanate, followed by chain extension with ethylene diamine), 30 parts silica powder, 20 parts pulp dust, 15 parts carbon black and 385 parts dimethyl formamide.

The coated solution was colled to 5° C. and blown with air at 20° C. having a relative humidity of 65%. A flow rate of 5 m./sec. was applied for a period of 90 seconds. The composite was then coagulated by soaking in a water bath. After removing solvent and drying, a microporous film was obtained. The film was further coated with a polyurethane type varnish, by the use of a gravure coater, to a thickness of 8 microns. After drying, it was then press-molded to develop a pore pattern similar to that of natural leather, and formed into a sheet-like material suited for use as a leather substitute.

A film obtained according to the procedure of this invention without the use of the flowing gas stream gave a non-uniform, coarse porous structure which yielded only a sheet-like material having a rough surface, even after gravure coating or embossing.

Example 6

The procedure of Example 2 was repeated using carbon dioxide gas for the air. The film obtained in this way had a faulty, coarse, pore number of zero per square centimeter. The pore number increased as much as 340/cm.$^2$ when the coagulation was effected after allowing the coated cloth to stand in static carbon dioxide gas for an hour.

Example 7

A 27% solution of nylon-6 in calcium chloride-methanol mixture was coated on a sheet of paper 1.0 mm. thick, subjected to an "air blow" in a manner similar to Example 3, and then soaked in water. After the coating film coagulated, the paper was rinsed with water until the calcium chloride was removed from the film, and it was then dried at 80° C. to give a microporous film of nylon-6 free from coarse faulty pores, 0.35 mm. thick, with a 0.45 g./cm.$^3$ apparent density and a moisture permeability of 3300 cc./m.$^2$/24 hr. A film prepared in a similar manner without utilizing the "air blow," but with a static exposure for 12 seconds, had a thickness of 0.50 mm., an apparent density of 0.30 g./cm.$^3$ and also had 25 faulty, coarse pores per square centimeter.

Example 8

The procedure of Example 7 was repeated using as the coating material a 45% (by weight) solution of 100 parts poly(vinyl chloride) of a molecular weight of 800 in which 15 mole percent vinyl acetate had been copolymerized, in dimethyl formamide. Further incorporated therein were 45 parts of dioctyl phthalate as a plasticizer. After blowing air in a manner similar to Example 7, and drying at 20° C., the film obtained had a completely microporous structure, and was absolutely free from coarse pores.

The number of coarse pores increased to 400 per square centimeter when a similarly formed film was allowed to stand under static conditions for 12 seconds, without the application of the air blow.

Example 9

The procedure of Example 1 was repeated except that the polymer solution coated on the non-woven cloth comprised a 35% solution of polyurethane (prepared by reacting one mole of polybutylene adipate (molecular weight of about 1,500) with 3 moles of tolylene diisocyanate and 0.75 mole butylene glycol in dimethyl acetamide (DMA) using 0.01 mole triethylenediamine as the catalyst). The film obtained had a thickness of 0.385 mm., an apparent density of 0.65 g./m.$^3$, a moisture permeability of 2,800 cc./m.$^2$/24 hr., a scratch strength of 1,200 g. and a fold strength of more than one million times at −20° C.

A film formed without the use of an "air blow" had a thickness of 0.543 mm., an apparent density of 0.33 g./cm.$^3$, a scratch strength of 750 g., and a fold strength of less than 50,000.

When the film was allowed to stand in air, without the application of the "air blow," under the condition described above (for the purpose of absorbing moisture), the number of faulty coarse pores in the film changed with the passage of time utilized for moisture absorption as shown in the following table.

| Time for moisture absorption (minutes): | Faulty coarse pores (numbers/cm.$^2$) |
|---|---|
| 0 | 400 |
| 1 | 400 |
| 3 | 400 |
| 5 | 400 |
| 10 | 250 |
| 30 | 150 |
| 60 | 72 |
| 120 | 5 |
| 180 | 0.3 |

Example 10

Composition: Parts
Polyurethane (the same as Example 1) _____ 80
Dioctyl phthalate _____ 10
Polyvinyl chloride _____ 20
Carbon black _____ 30
Calcium carbonate powder _____ 40
Dimethyl formamide _____ 520

A coating material having the above composition was applied to two polyester film samples, one being treated according to the process of this invention, and the other being treated according to the hygroscopic process under the following conditions:

This invention: Flow rate 4 m./sec., 20° C., 65% RH, distance between nozzle and solution surface 10 cm., angle of ejection 90°.

Hygroscopic process: Allowed to stand in air at 20° C., RH of 65%.

After treatment for certain definite periods, the samples were put in water for coagulation, followed by solvent removal. The minimum times required to form micropores (observed by a microscope) are given in the table below:

| Thickness of the polymer solution, mm. | Hygroscopic process, min. | Process of this invention, min. |
|---|---|---|
| 0.5 | 30 | 0.5 |
| 1.0 | 45 | 0.3 |
| 1.5 | 60 | 0.45 |
| 2.0 | 150 | 0.5 |
| 4.0 | 400 | 0.5 |

From the table, it is apparent that the process of this invention enables the formation of microporous structure within a much shorter period of time than in the hygroscopic process.

Example 11

A polyester film was coated with a solution or dispersion (solid content of 33%) of 80 parts polyurethane, 10 parts carbon black and 50 parts light coal in dimethyl formamide by the use of a 1.5 mm. clearance blade. It was then treated according to the following conditions:

The process of this invention: 20° C., 65% RH, 4 m./sec. 40 sec., distance between nozzle and solution surface 10 cm., angle of ejection 90°.

Hygroscopic process: 20° C., allowed to stand in air of 65% RH.

Thereafter, a film of 0.63 mm. formed and was stripped out of the polyester film. The film was then laminated on a non-woven cloth (the same type as used in Example 1) which had been coated with an adhesive, comprising 50 parts polyurethane and 100 parts dimethyl formamide, at the concentration of 50 g./m.$^2$, coagulated by immersion in water, and finally sliced into a thickness of 1.5 mm. A comparison of the performances of each product is given in the following table.

| | Process of this invention | Hygroscopic process | Natural leather (calf) |
|---|---|---|---|
| Wrinkle formation | Yes | No | Yes |
| Scratch strength (g.) | 1,100 | 800 | 500 |
| Moisture permeability (g./cm.²/24 hr.) | 2,020 | 1,850 | 4,800 |
| Internal surface area (m.²/g.) | 1.2 | 1.8 | 1.1 |

NOTE.— The wrinkle formation was observed when the coated film was bent inwards.

The scratch strength is expressed by the load weight at which the sample developed slight scratches, using a Clemen Scratch Hardness Tester.

The moisture permeability was measured according to JIS Z 0208.

The internal surface area was measured by determining the amount of nitrogen adsorption at a lower temperature (the temperature of liquid nitrogen) which was then used to calculate the area using the adsorption isothermal equation of BET.

It is apparent from the table that the hygroscopic process does not develop any wrinkles, but the process of this invention gives fine wrinkles very similar to natural leather, and thus imparts a high commercial value to products made therefrom.

What is claimed is:

1. A process for the production of a vapor permeable sheet-like material which comprises
    (a) coating a solution of a film-forming polymeric material on a support material,
    (b) applying a gas stream to the coated surface at a flow rate of from 5 m./sec. to 50 m./sec. until a dense gelated layer forms on the surface when the coated material is thereafter subjected to a coagulating treatment,
    (c) coagulating said polymeric material by treating with a liquid containing a non-solvent for both the support material and the polymeric material,
    (d) removing the solvent from the polymeric material, and,
    (e) drying.

2. The process of claim 1 in which the coagulation is effected by immersing the coated material in a liquid, said liquid being at least partially soluble to a solvent in the film-forming polymer but being a non-solvent for the film-forming polymer material.

3. The process of claim 1 in which the gas flow is applied for a period of at least 5 seconds.

4. The process of claim 1 in which the coagulation is carried out in water.

5. The process of claim 1 in which the gas is selected from the group consisting of air, nitrogen and carbon dioxide.

6. The process of claim 1 in which the film-forming polymer is at least one member selected from the group consisting of polyurethanes, polyamides, poly(vinyl chloride), copolymers containing vinyl chloride and mixtures thereof.

7. The process of claim 1 in which the solvent for the film-forming polymer is at least one member selected from the group consisting of dimethyl formamide, dimethyl sulfoxide and dimethyl acetamide.

8. The process of claim 1 in which the support material is a non-woven cloth or a plastic film.

9. A process for the production of a vapor permeable sheet-like material which comprises
    (a) coating a solution of a film-forming polymeric material on a support material,
    (b) applying to the coated surface a gas stream at a flow rate of from 5 m./sec. to 50 m./sec. until a dense gelated layer forms on the surface when the coated material is thereafter subjected to coagulation,
    (c) coagulating the polymeric material by treating with a liquid containing a non-solvent for both the support material and the polymeric material,
    (d) removing the solvent from the polymeric material;
    (e) drying,
    (f) stripping off the support material, and
    (g) combining the film with an artificial leather substrate.

10. The process of claim 9 in which the support material is a film.

11. The process of claim 9 in which the artificial leather substrate is a non-woven cloth.

References Cited

UNITED STATES PATENTS

| | | | |
|---|---|---|---|
| 3,100,721 | 8/1963 | Holden | 117—63 |
| 3,208,875 | 9/1965 | Holden | 117—63 |
| 3,000,757 | 9/1961 | Johnston et al. | 117—63 |
| 3,190,765 | 6/1965 | Yuan | 117—63 |
| 1,574,890 | 3/1926 | Hofmann | 117—9 |
| 2,615,822 | 10/1952 | Huebner | 117—47 |
| 2,721,811 | 10/1955 | Dacey et al. | 117—65 |
| 3,516,883 | 6/1970 | Harper | 117—65.2 |

WILLIAM D. MARTIN, Primary Examiner

M. SOFOCLEOUS, Assistant Examiner

U.S. Cl. X.R.

117—63, 65.2, 135.5; 156—77, 246, 285; 264—216, 331